B. TIMMONS.
AUTOMATIC FISH HOOK.
APPLICATION FILED MAY 9, 1908.

911,781.

Patented Feb. 9, 1909.
2 SHEETS—SHEET 1.

Witnesses
C. K. Reichenbach
C. N. Woodward

Inventor
Benjamin Timmons
By Chandler & Chandler
Attorneys

THE NORRIS PETERS CO., WASHINGTON, D. C.

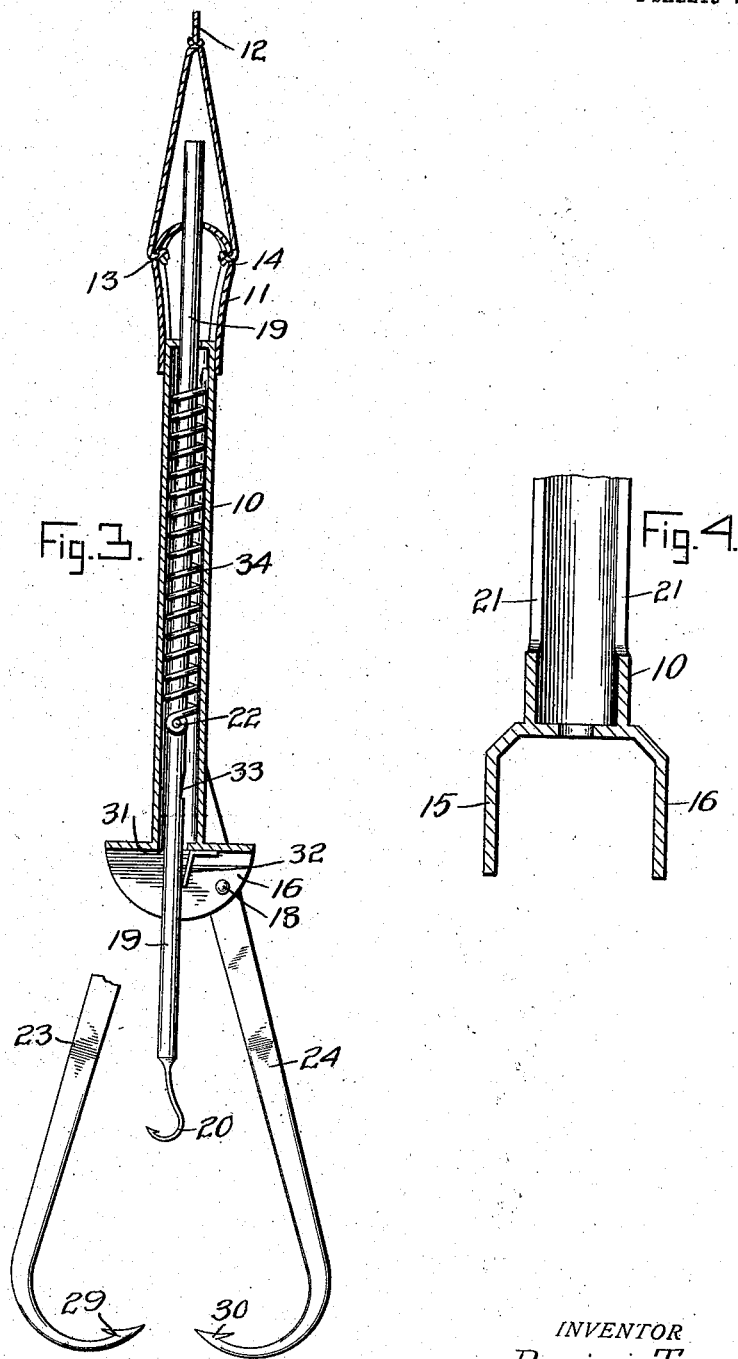

UNITED STATES PATENT OFFICE.

BENJAMIN TIMMONS, OF McKINNEY, TEXAS.

AUTOMATIC FISH-HOOK.

No. 911,781.      Specification of Letters Patent.      Patented Feb. 9, 1909.

Application filed May 9, 1908. Serial No. 431,914.

*To all whom it may concern:*

Be it known that I, BENJAMIN TIMMONS, a citizen of the United States, residing at McKinney, in the county of Collin, State of Texas, have invented certain new and useful Improvements in Automatic Fish-Hooks; and I do hereby declare the following to be a full, clear, and exact description of the invention, such as will enable others skilled in the art to which it appertains to make and use the same.

This invention relates to fishing appliances, more particularly to the class of fish hooks wherein spring actuated appliances are embodied which catch the fish by the head when the bait is disturbed, and has for one of its objects to simplify and improve the construction of devices of this character.

Another object of the invention is to provide a simply constructed device wherein catch arms are arranged and maintained in distended position so long as the bait is undisturbed but which will be released and moved toward each other and catch the fish between them when the bait is disturbed by the fish.

Figure 1:
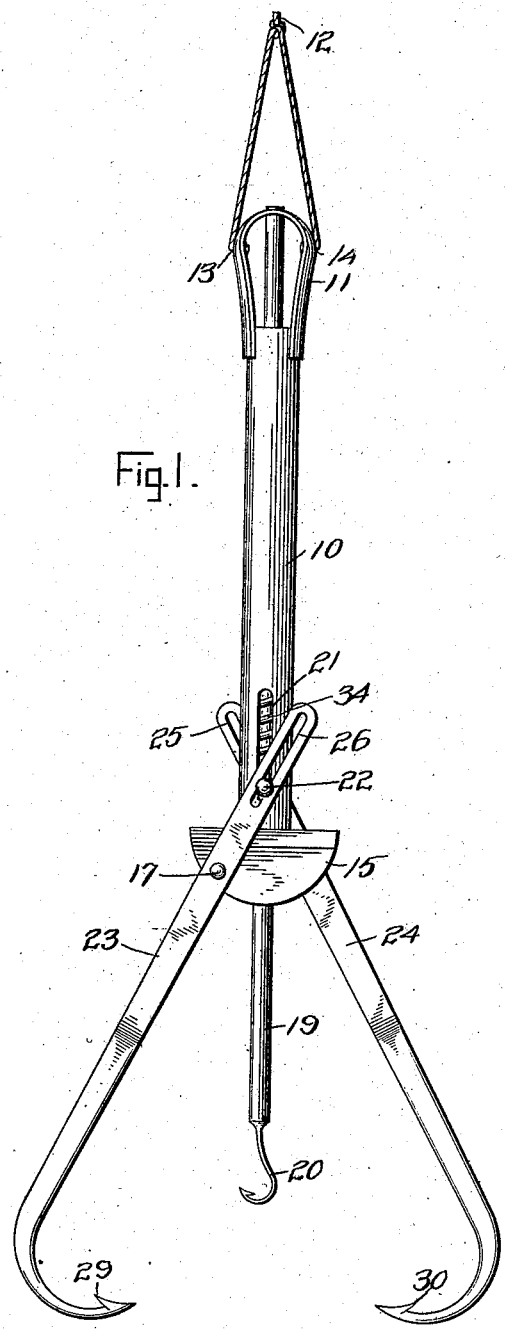
Figure 2:
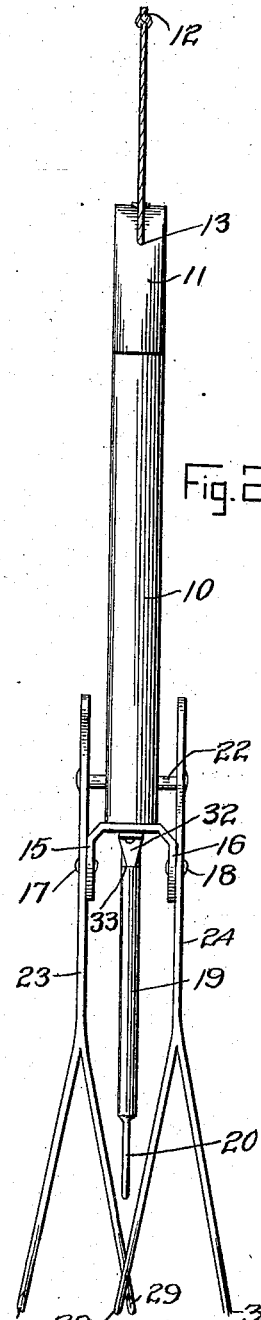

With these and other objects in view the invention consists in certain novel features of construction hereafter shown and described and then specifically pointed out in the claims, and in the drawings illustrating the preferred embodiment of the invention. Figure 1 is a side elevation of the improved device with catch arms distended and the bait holding portions projected. Fig. 2 is an edge view of the improved device with the catch arms distended and the bait holding portions projected. Fig. 3 is a longitudinal sectional elevation with the catch arms in closed position, and the bait holding element withdrawn. Fig. 4 is a sectional detail of the guard wings and the adjacent portion of the tubular member illustrating their construction.

The improved device comprises a tubular body 10 having a bail or loop 11 at opposite sides of which the lead line 12 is connected as at 13—14, while guard wings 15—16 are arranged at the opposite end of the tubular member, the guard wing 15 having a lateral pin 17, while the guard wing 16 has a lateral pin 18, the pins being arranged at opposite sides of the center of the tubular member, as shown.

Movably disposed through the tubular member is a rod 19, one end of the rod extending through the bail 11 while the other end extends through the opposite end of the tubular member and between the guard wings 15—16, and is provided with a bait holding hook 20 at the end which extends between the guards. A spring 34 surrounds the rod within the tubular member and is connected at one end to the tubular member and at the other end to the rod and operates to maintain the rod yieldably in withdrawn position, the object to be hereafter explained.

The tubular member 10 is provided with longitudinal transversely alining slots 21, and extending through the rod 19 and also projecting through the slots 21 is a pin 22, and engaging over this pin by a slot at one side of the tubular member is a catch arm 23, while a similar catch arm 24 is engaged over the opposite end of the pin 22 by a slot 25, the catch arms thus movably engaging the pins 17—18. The catch arm 23 thus projects over the guard wing 15 and engages the pin 22 by its slot 26, while the catch arm 24 projects over the guard wing 16 and engages the pin 22 by the slot 25. The free ends of the arms 23—24 curve inwardly from opposite sides and are pointed as at 27—28, and also preferably provided with barbs 29—30.

The aperture in the end of the tubular member 10 next to the wings 15—16 is enlarged laterally as at 31, so that the rod 19 is afforded a certain degree of play laterally, and attached to the wing portion of the structure is a resilient trigger 32 engaging a notch 33 in the rod 19, the notch being so located as to engage the trigger 32 when the rod 19 is in its projected or outward position or with the spring 34 distended.

When the rod 19 is in its outward or projected position, the pin 22 will be at the end of the slot 21 nearest to the wings 15—16, which position will cause the catch arms 23—24, through the coaction of the slots 25, 26 and pins 17—18, to hold the catch arms in separated position, or with the points 27—28 distended. Then any attempt of the fish to remove the bait from the hook 20 will cause the rod to move laterally and release it from the trigger 33 and permit the spring 34 to instantly forcibly withdraw the rod and simultaneously move the arms 23—24 inwardly and catch the fish between the points 27—28 and the barbs 29—30.

The free ends of the arms 23—24 are preferably forked or bifurcated, to form two points upon each arm, each point being preferably barbed, as shown. This construction, it will be obvious, materially increases the utility of the device, and renders it impossible for a fish to escape if the trigger 32 is once released.

The parts will be of metal of suitable strength and size, and plated or otherwise protected and ornamented.

The device may be manufactured at small expense, and in varying sizes to suit different kinds of fish.

What is claimed, is:—

1. An automatic fish hook comprising a body, a rod movable through said body and with a bait hook at one end, a spring engaging said rod and operating to hold the same yieldably withdrawn, catch arms swinging from said body and pointed at their free ends, means operating to maintain said arms in distended position when the rod is projected, and a trigger device holding the rod projected and adapted to be released by the action of the fish in attempting to remove the bait.

2. An automatic fish hook comprising a body having lateral wings, a rod movable through said body and provided with a bait hook at one end and with a laterally extending pin, a spring engaging said rod and operating to hold the same yieldably withdrawn, catch arms swinging upon said wings and pointed at their free ends and with longitudinal slots movable over said pin whereby the catch arms are operated by the movement of the rod, and a trigger device holding the rod projected and adapted to be released by the action of the fish in attempting to remove the bait.

3. An automatic fish hook comprising a tubular body having oppositely disposed longitudinal slots and spaced guard wings at one end provided with lateral pins, a rod movable through said body and between said guard wings and having a bait hook at one end, a pin extending through said rod and projecting through said slots, a spring within said body and operating to hold the rod withdrawn, catch arms swinging upon the pins of said wings and pointed at their free ends and having longitudinal slots movably engaging the pin of said rod, and a trigger device connected to said body between said wings and guarded thereby, and operating to hold said rod in extended position, said trigger arranged to be released by the action of the fish in attempting to remove the bait.

In testimony whereof, I affix my signature, in presence of two witnesses.

BENJAMIN TIMMONS.

Witnesses:
 JAMES M. MUSE,
 C. H. KIRKPATRICK.